United States Patent
Konduri et al.

(10) Patent No.: US 12,556,596 B2
(45) Date of Patent: Feb. 17, 2026

(54) DELAYING LIVE COMMUNICATIONS

(71) Applicant: Apple Inc., Cupertino, CA (US)

(72) Inventors: Preethi Konduri, Cupertino, CA (US);
Justin R. Etzine, San Jose, CA (US);
Austin W. Shyu, San Jose, CA (US);
William Spurgeon, Cupertino, CA (US); Pierre J. De Filippis, Los Gatos, CA (US); Daniel B. Pollack, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/426,238

(22) Filed: Jan. 29, 2024

(65) Prior Publication Data

US 2024/0406233 A1 Dec. 5, 2024

Related U.S. Application Data

(60) Provisional application No. 63/470,822, filed on Jun. 2, 2023.

(51) Int. Cl.
*H04L 65/403* (2022.01)

(52) U.S. Cl.
CPC ................... *H04L 65/403* (2013.01)

(58) Field of Classification Search
CPC .... H04L 65/103; H04L 65/104; H04L 65/403
USPC ......................................................... 709/204
See application file for complete search history.

(56) References Cited

U.S. PATENT DOCUMENTS

| | | | | |
|---|---|---|---|---|
| 8,295,819 B1 * | 10/2012 | Kaplan | ................... | H04L 51/48 |
| | | | | 379/88.19 |
| 8,880,045 B2 * | 11/2014 | Balan | ...................... | H04W 4/16 |
| | | | | 455/418 |
| 9,106,473 B2 * | 8/2015 | Altberg | ................. | H04L 65/103 |

* cited by examiner

*Primary Examiner* — Glenford J Madamba
(74) *Attorney, Agent, or Firm* — Kyle Morse; BAKERHOSTETLER (57) ABSTRACT

Some techniques are described herein to enable a sending device to provide personalized data to a receiving device before a live communication is initialized. For example, a sending device can selectively delay a live communication and, when doing so, send a request for a receiving device to access personalized data from a server. Such techniques allow the receiving device to access the personalized data before the live communication is initialized so that the personalized data can be used when the live communication is initialized.

30 Claims, 6 Drawing Sheets

DELAYING LIVE COMMUNICATIONS

CROSS-REFERENCE TO RELATED APPLICATIONS

The present application claims priority to U.S. Provisional Patent Application Ser. No. 63/470,822, entitled "DELAYING LIVE COMMUNICATIONS" filed Jun. 2, 2023, which is hereby incorporated by reference in its entirety for all purposes.

BACKGROUND

The use of digital profiles (e.g., personalized digital representations) is becoming increasingly prevalent. Using current techniques, such digital profiles often arrive at receiving devices after they are needed. Accordingly, there is a need to improve techniques for sending personalized data between devices.

SUMMARY

Current techniques for sending personalized data between devices are time consuming and/or ineffective. For example, some techniques do not allow for personalized data to be received by the time a live communication is initiated between two devices. This disclosure provides more effective and/or efficient techniques for sending personalized data between devices.

Some techniques are described herein to enable a sending device to provide personalized data to a receiving device before a live communication is initialized. For example, a sending device can selectively delay a live communication and, when doing so, send a request for a receiving device to access personalized data from a server. Such techniques allow the receiving device to access the personalized data before the live communication is initialized so that the personalized data can be used when the live communication is initialized.

In some embodiments, a method that is performed at a first device is described. In some embodiments, the method comprises: detecting an input corresponding to a request to establish a live communication with a second device different from the first device; in response to detecting the input and in accordance with a determination that a first set of one or more delay criteria is satisfied: delaying initiation of the live communication; and sending, to the second device, a request to access data corresponding to the first device; and after delaying initiation of the live communication, initiating the live communication.

In some embodiments, a non-transitory computer-readable storage medium storing one or more programs configured to be executed by one or more processors of a first device is described. In some embodiments, the one or more programs includes instructions for: detecting an input corresponding to a request to establish a live communication with a second device different from the first device; in response to detecting the input and in accordance with a determination that a first set of one or more delay criteria is satisfied: delaying initiation of the live communication; and sending, to the second device, a request to access data corresponding to the first device; and after delaying initiation of the live communication, initiating the live communication.

In some embodiments, a transitory computer-readable storage medium storing one or more programs configured to be executed by one or more processors of a first device is described. In some embodiments, the one or more programs includes instructions for: detecting an input corresponding to a request to establish a live communication with a second device different from the first device; in response to detecting the input and in accordance with a determination that a first set of one or more delay criteria is satisfied: delaying initiation of the live communication; and sending, to the second device, a request to access data corresponding to the first device; and after delaying initiation of the live communication, initiating the live communication.

In some embodiments, a first device is described. In some embodiments, the first device comprises one or more processors and memory storing one or more programs configured to be executed by the one or more processors. In some embodiments, the one or more programs includes instructions for: detecting an input corresponding to a request to establish a live communication with a second device different from the first device; in response to detecting the input and in accordance with a determination that a first set of one or more delay criteria is satisfied: delaying initiation of the live communication; and sending, to the second device, a request to access data corresponding to the first device; and after delaying initiation of the live communication, initiating the live communication.

In some embodiments, a first device is described. In some embodiments, the first device comprises means for performing each of the following steps: detecting an input corresponding to a request to establish a live communication with a second device different from the first device; in response to detecting the input and in accordance with a determination that a first set of one or more delay criteria is satisfied: delaying initiation of the live communication; and sending, to the second device, a request to access data corresponding to the first device; and after delaying initiation of the live communication, initiating the live communication.

In some embodiments, a computer program product is described. In some embodiments, the computer program product comprises one or more programs configured to be executed by one or more processors of a first device. In some embodiments, the one or more programs include instructions for: detecting an input corresponding to a request to establish a live communication with a second device different from the first device; in response to detecting the input and in accordance with a determination that a first set of one or more delay criteria is satisfied: delaying initiation of the live communication; and sending, to the second device, a request to access data corresponding to the first device; and after delaying initiation of the live communication, initiating the live communication.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

The following description sets forth exemplary methods, parameters, and the like. It should be recognized, however, that such description is not intended as a limitation on the scope of the present disclosure but is instead provided as a description of exemplary embodiments.

Methods and/or processes described herein can include one or more steps that are contingent upon one or more conditions being satisfied. It should be understood that a method can occur over multiple iterations of the same process with different steps of the method being satisfied in different iterations. For example, if a method requires performing a first step upon a determination that a set of one or more criteria is met and a second step upon a determination that the set of one or more criteria is not met, a person of ordinary skill in the art would appreciate that the steps of the method are repeated until both conditions, in no particular order, are satisfied. Thus, a method described with steps that are contingent upon a condition being satisfied can be rewritten as a method that is repeated until each of the conditions described in the method are satisfied. This, however, is not required of system or computer readable medium claims where the system or computer readable medium claims include instructions for performing one or more steps that are contingent upon one or more conditions being satisfied. Because the instructions for the system or computer readable medium claims are stored in one or more processors and/or at one or more memory locations, the system or computer readable medium claims include logic that can determine whether the one or more conditions have been satisfied without explicitly repeating steps of a method until all of the conditions upon which steps in the method are contingent have been satisfied. A person having ordinary skill in the art would also understand that, similar to a method with contingent steps, a system or computer readable storage medium can repeat the steps of a method as many times as needed to ensure that all of the contingent steps have been performed.

Although the following description uses terms "first," "second," etc. to describe various elements, these elements should not be limited by the terms. In some embodiments, these terms are used to distinguish one element from another. For example, a first subsystem could be termed a second subsystem, and, similarly, a subsystem device could be termed a subsystem device, without departing from the scope of the various described embodiments. In some embodiments, the first subsystem and the second subsystem are two separate references to the same subsystem. In some embodiments, the first subsystem and the second subsystem are both subsystems, but they are not the same subsystem or the same type of subsystem.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when," "upon," "in response to determining," "in response to detecting," or "in accordance with a determination that" depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," or "in accordance with a determination that [the stated condition or event]" depending on the context.

Figure 1:
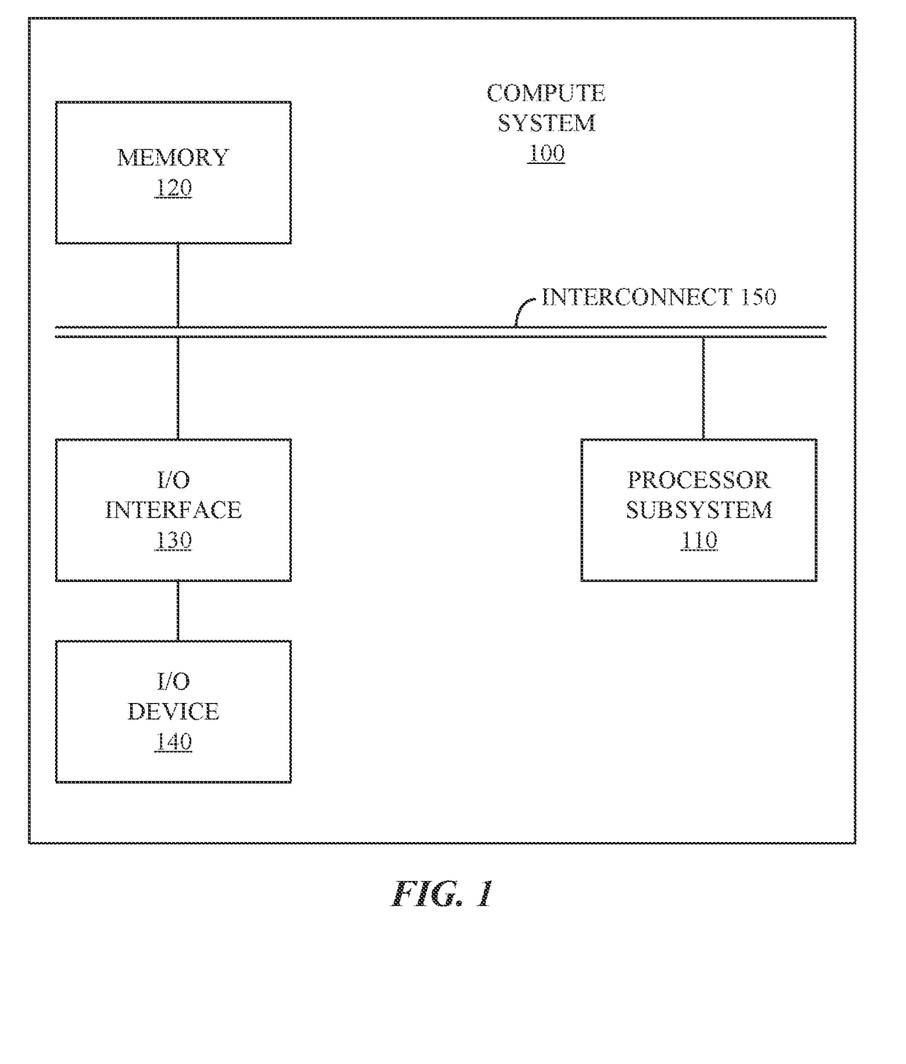
FIG. 1 is a block diagram illustrating a computer system in accordance with some embodiments.

Turning to FIG. 1, a block diagram of compute system 100 is illustrated. Compute system 100 is a non-limiting embodiment of a compute system that can be used to perform functionality described herein. It should be recognized that other computer architectures of a compute system can be used to perform functionality described herein.

In the illustrated embodiment, compute system 100 includes processor subsystem 110 communicating with (e.g., wired or wirelessly) memory 120 (e.g., a system memory) and I/O interface 130 via interconnect 150 (e.g., a system bus, one or more memory locations, or other communication channel for connecting multiple components of compute system 100). In addition, I/O interface 130 is communicating with (e.g., wired or wirelessly) to I/O device 140. In some embodiments, I/O interface 130 is included with I/O device 140 such that the two are a single component. It should be recognized that there can be one or more I/O interfaces, with each I/O interface communicating with one or more I/O devices. In some embodiments, multiple instances of processor subsystem 110 can be communicating via interconnect 150.

Compute system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. In some embodiments, compute system 100 is included or communicating with a physical component for the purpose of modifying the physical component in response to an instruction. In some embodiments, compute system 100 receives an instruction to modify a physical component and, in response to the instruction, causes the physical component to be modified. In some embodiments, the physical component is modified via an actuator, an electric signal, and/or algorithm. Examples of such physical components include an acceleration control, a break, a gear box, a hinge, a motor, a pump, a refrigeration system, a spring, a suspension system, a steering control, a pump, a vacuum system, and/or a valve. In some embodiments, a sensor includes one or more hardware components that detect information about a physical environment in proximity to (e.g., surrounding) the sensor. In some embodiments, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera sensor, a radar sensor, and/or a LiDAR sensor), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. In some embodiments, a sensor includes a combination of multiple sensors. In some embodiments, sensor data is captured by fusing data from one sensor with data from one or more other sensors. Although a single compute system is shown in FIG. 1, compute system 100 can also be implemented as two or more compute systems operating together.

In some embodiments, processor subsystem 110 includes one or more processors or processing units configured to execute program instructions to perform functionality described herein. For example, processor subsystem 110 can execute an operating system, a middleware system, one or more applications, or any combination thereof.

In some embodiments, the operating system manages resources of computer system 100. Examples of types of operating systems covered herein include batch operating systems (e.g., Multiple Virtual Storage (MVS)), time-sharing operating systems (e.g., Unix), distributed operating systems (e.g., Advanced Interactive executive (AIX), network operating systems (e.g., Microsoft Windows Server)), and real-time operating systems (e.g., QNX). In some embodiments, the operating system includes various procedures, sets of instructions, software components, and/or drivers for controlling and managing general system tasks (e.g., memory management, storage device control, power management, or the like) and for facilitating communication between various hardware and software components. In some embodiments, the operating system uses a priority-based scheduler that assigns a priority to different tasks that processor subsystem 110 can execute. In such embodiments, the priority assigned to a task is used to identify a next task to execute. In some embodiments, the priority-based scheduler identifies a next task to execute when a previous task finishes executing. In some embodiments, the highest priority task runs to completion unless another higher priority task is made ready.

In some examples, the middleware system provides one or more services and/or capabilities to applications (e.g., the one or more applications running on processor subsystem 110) outside of what the operating system offers (e.g., data management, application services, messaging, authentication, API management, or the like). In some examples, the middleware system is designed for a heterogeneous computer cluster to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some examples, the middleware system represents processes and/or operations using a graph architecture, where processing takes place in nodes that can receive, post, and multiplex sensor data messages, control messages, state messages, planning messages, actuator messages, and other messages. In such examples, the graph architecture can define an application (e.g., an application executing on processor subsystem 110 as described above) such that different operations of the application are included with different nodes in the graph architecture.

In some examples, a message sent from a first node in a graph architecture to a second node in the graph architecture is performed using a publish-subscribe model, where the first node publishes data on a channel in which the second node can subscribe. In such examples, the first node can store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 can include a computer readable medium (e.g., non-transitory or transitory computer readable medium) usable to store (e.g., configured to store, assigned to store, and/or that stores) program instructions executable by processor subsystem 110 to cause compute system 100 to perform various operations described herein. For example, memory 120 can store program instructions to implement the functionality associated with methods 600 (FIG. 6) described below.

Memory 120 can be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, or the like), read only memory (PROM, EEPROM, or the like), or the like. Memory in compute system 100 is not limited to primary storage such as memory 120. Compute system 100 can also include other forms of storage such as cache memory in processor subsystem 110 and secondary storage on I/O device 140 (e.g., a hard drive, storage array, etc.). In some examples, these other forms of storage can also store program instructions executable by processor subsystem 110 to perform operations described herein. In some examples, processor subsystem 110 (or each processor within processor subsystem 110) contains a cache or other form of on-board memory.

I/O interface 130 can be any of various types of interfaces configured to communicate with other devices. In some embodiments, I/O interface 130 includes a bridge chip (e.g., Southbridge) from a front-side bus to one or more back-side buses. I/O interface 130 can communicate with one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide-area network), sensor devices (e.g., camera, radar, LiDAR, ultrasonic sensor, GPS, inertial measurement device, or the like), and auditory or visual output devices (e.g., speaker, light, screen, projector, or the like). In some embodiments, compute system 100 is communicating with a network via a network interface device (e.g., configured to communicate over Wi-Fi, Bluetooth, Ethernet, or the like). In some embodiments, compute system 100 is directly wired to the network.

Figure 2:
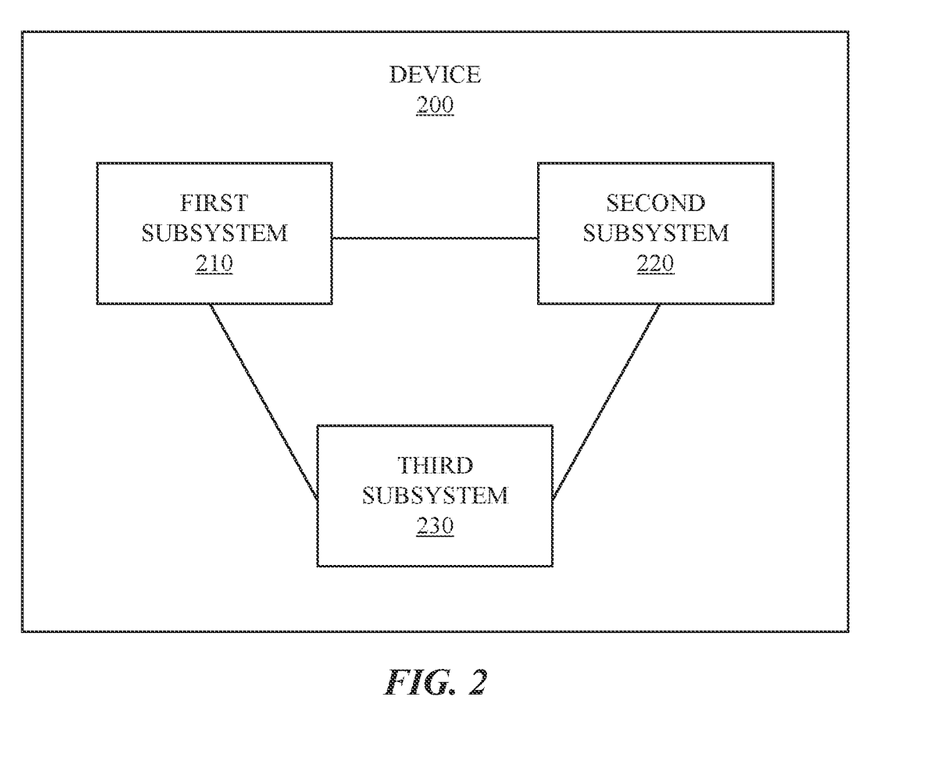
FIG. 2 is a block diagram illustrating a device with interconnected subsystems in accordance with some embodiments.

FIG. 2 illustrates a block diagram of device 200 with interconnected subsystems in accordance with some embodiments. In the illustrated embodiment, device 200 includes three different subsystems (i.e., first subsystem 210, second subsystem 220, and third subsystem 230) communicating with (e.g., wired or wirelessly) each other, creating a network (e.g., a personal area network, a local area network, a wireless local area network, a metropolitan area network, a wide area network, a storage area network, a virtual private network, an enterprise internal private network, a campus area network, a system area network, and/or a controller area network). An example of a possible computer architecture of a subsystem as included in FIG. 2 is described in FIG. 1 (i.e., compute system 100). Although three subsystems are shown in FIG. 2, device 200 can include more or fewer subsystems.

In some embodiments, some subsystems are not connected to other subsystem (e.g., first subsystem 210 can be connected to second subsystem 220 and third subsystem 230 but second subsystem 220 cannot be connected to third subsystem 230). In some embodiments, some subsystems are connected via one or more wires while other subsystems are wirelessly connected. In some embodiments, messages are sent between the first subsystem 210, second subsystem 220, and third subsystem 230, such that when a respective subsystem sends a message the other subsystems receive the message (e.g., via a wire and/or a bus). In some embodiments, one or more subsystems are wirelessly connected to one or more compute systems outside of device 200, such as a server system. In such embodiments, the subsystem can be configured to communicate wirelessly to the one or more compute systems outside of device 200.

In some embodiments, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some embodiments, device 200 is configured to navigate (with or without user input) in a physical environment.

In some embodiments, one or more subsystems of device 200 are used to control, manage, and/or receive data from one or more other subsystems of device 200 and/or one or more compute systems remote from device 200. For example, first subsystem 210 and second subsystem 220 can each be a camera that captures images, and third subsystem 230 can use the captured images for decision making. In some embodiments, at least a portion of device 200 functions as a distributed compute system. For example, a task can be split into different portions, where a first portion is executed by first subsystem 210 and a second portion is executed by second subsystem 220.

As used herein, an "installed application" refers to a software application that has been downloaded onto a computer system (e.g., compute system 100 and/or device 200) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of a system/global internal state and/or an application internal state). An open or executing application is, optionally, any one of the following types of applications:
   an active application, which is currently displayed on a display screen of the device that the application is being used on;
   a background application (or background processes), which is not currently displayed, but one or more processes for the application are being processed by one or more processors; and
   a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards techniques for sending personalized data between devices. Such techniques are described in the context of a sending device delaying a live communication. It should be recognized that other contexts can be used with techniques described herein and that data sent should not be limited to personalized data. For example, a multi-user device can send a list of functions provided by the multi-user device to another device before connecting with the other device using techniques described herein. In addition, techniques optionally complement or replace other techniques for sending personalized data between devices.

Figure 3:
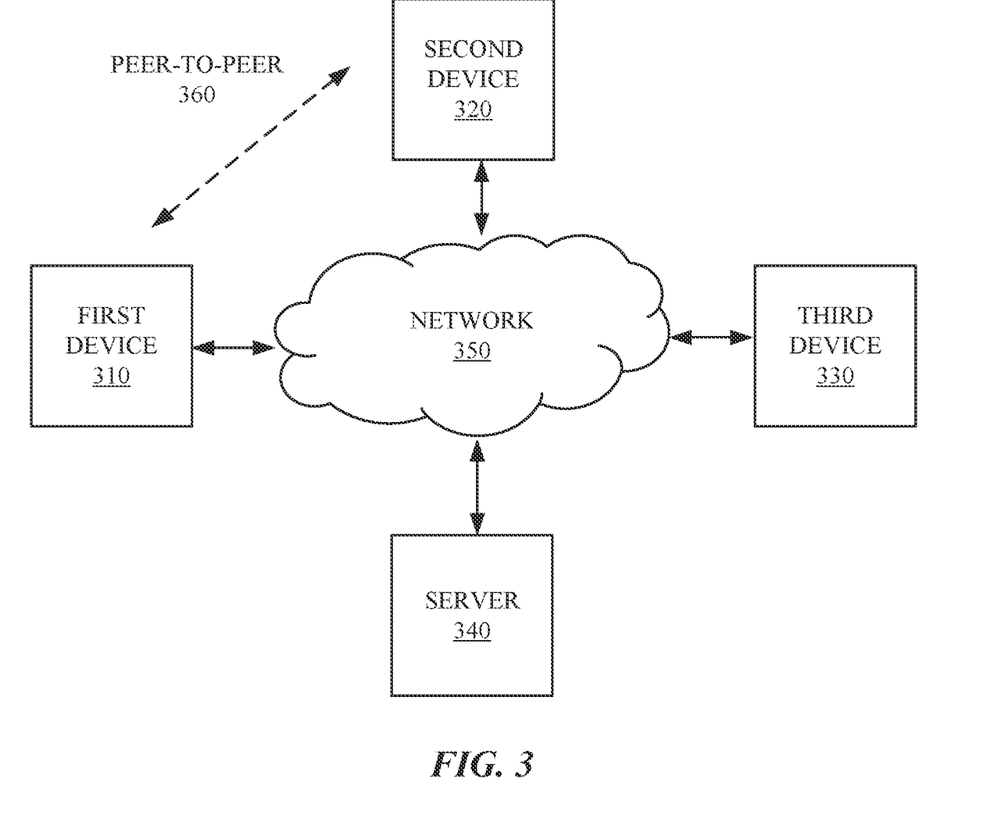
FIG. 3 is a block diagram illustrating a network configuration in accordance with some embodiments.

FIG. 3 is a block diagram illustrating a network environment in accordance with some embodiments. As illustrated in FIG. 3, the network environment includes first device 310, second device 320, third device 330, and server 340. It should be recognized that not all of the devices depicted in FIG. 3 are required in all embodiments. Some embodiments may include additional and/or different devices than those illustrated in FIG. 3. In some embodiments, one or more devices in FIG. 3 include one or more components described above with respect to compute system 100 and/or device 200. Additional, different, and/or fewer components can be used as well.

As illustrated, the four devices of FIG. 3 are communicatively (e.g., directly via peer-to-peer channel 360 and/or indirectly via network 350) coupled to each other. In some examples, using peer-to-peer (P2P) channel 360, devices (e.g., first device 310 and second device 320) communicate directly with each other in a decentralized manner, without the need for a central server, router, and/or switch. Some examples of communication protocols used for peer-to-peer channel 360 include near field communication (NFC), Bluetooth, Zigbee, Wi-Fi Direct, Z-wave, and Infrared (IR). In some examples, using network 350, devices (e.g., first device 310, second device 320, third device 330, and/or server 340) communicate through another device in a centralized manner, using a central server, router, and/or switch. For example, network 350 can be an interconnected network of devices that includes, or is communicatively coupled to, the Internet and/or another type of network. Examples of network 350 include a Wide Area Network (WAN), a Metropolitan Area Network (MAN), a Local Area Network (LAN), a Wireless Local Area Network (WLAN), a Cellular Network, a Public Switched Telephone Network (PSTN), a Voice over Internet Protocol (VOIP) Network, an Internet Protocol (IP) Network, Satellite Network, a Client-Server Network, an Internet of Things (IoT) Network, and a Cloud Computing Network. For explanatory purposes, FIG. 3 illustrates devices 310-340 communicating via network 350 and first device 310 and second device 320 communicating via peer-to-peer channel 360; however, it should be recognized that any number of devices can be communicatively coupled to each other directly or via network 350.

In some examples, each of first device 310, second device 320, and/or third device 330 is a smart phone, a smart watch, a fitness tracking device, a laptop, a desktop, a tablet, and/or a television. In such examples, server 340 can provide one or more services to devices 310-330, such as storing data and/or performing operations. As mentioned above, each device in FIG. 3 (e.g., first device 310, second device 320, third device 330, and server 340) can communicate with each other via one or more networks (e.g., network 350) and/or directly through a peer-to-peer channel (e.g., peer-to-peer channel 360). Such communication can include exchange or transmission of data such as a digital profile, text, a widget, an application, an animation, an emoji, a representation of a user, a document, calendar information, personally-identifiable information, a file, an image, video, and/or audio.

Attention is now directed towards techniques for sending personalized data between devices. Such techniques are described in the context of a personal device of a user initiating a live communication with a personal device of another user. It should be recognized that other contexts and/or other types of electronic devices can be used with techniques described herein. For example, a multi-user device and/or a device that does not belong to and/or is not associated with a user can be used with techniques described herein. In addition, techniques optionally complement or replace other techniques for sending data between devices.

Figure 4:
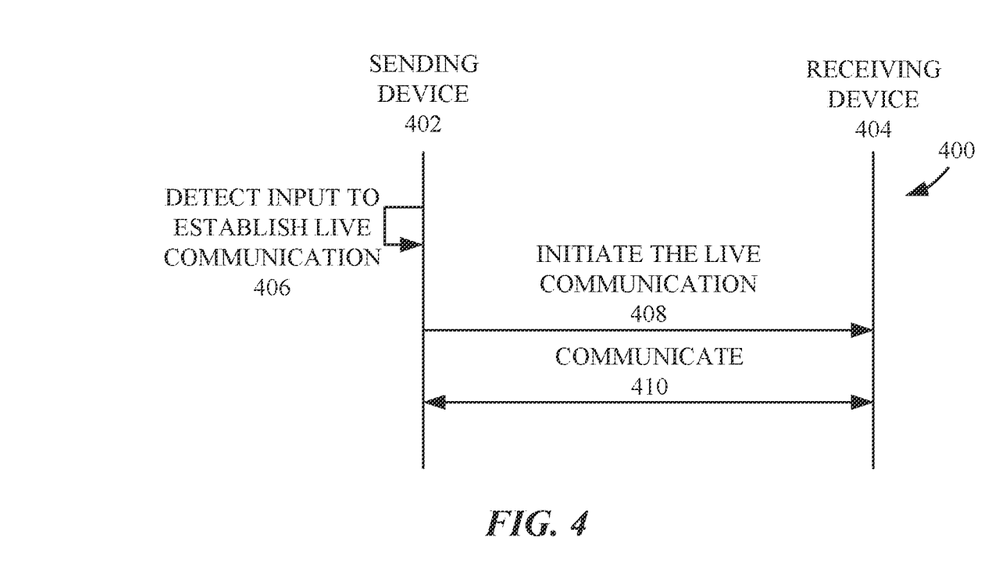
FIG. 4 is a swim-lane diagram illustrating a process to initiate a live communication in accordance with some embodiments.

FIG. 4 is a swim-lane diagram illustrating a process (e.g., process 400) to initiate a live communication in accordance with some examples. As illustrated, process 400 includes sending device 402 and receiving device 404. In some examples, sending device 402 and/or receiving device 404 includes one or more components and/or functionality described above with respect to first device 310, second device 320, third device 330, device 200, and/or compute system 100. In some examples, the live communication of FIG. 4 includes different types of communication, including a telephone call via a PSTN network, an internet call via a VoIP network, and/or data transfer via a peer-to-peer channel.

In the example of the live communication being a telephone call, sending device 402 can detect input to establish the live communication with receiving device 404 via a PSTN network (406). In some examples, the input at 406 includes a selection input of a call button after detecting an input of a phone number at a keypad of sending device 402. In other examples, the input at 406 includes a voice command to call another user and/or device. It should be recognized that other types of input via other types of user interfaces are within scope of this disclosure, and the examples described above are intended to provide some illustrative examples. In response to detecting the input at 406 with respect to the telephone call, sending device 402 calls (e.g., initiates the live communication with) receiver device 404 via the PSTN network (408). As a result of calling via the PSTN network, receiving device 404 can receive a communication via the PSTN network from sending device 402 indicating that sending device 402 is requesting to establish the telephone call with receiving device 404. In some examples, after receiving device 404 accepts the telephone call, sending device 402 and/or receiving device 404 sends audio data to the other device (410). For example, sending device 402 can detect first audio data via one or more sensors (e.g., a microphone) of sending device 402 and send the first audio data to receiving device 404 while receiving device 404 can detect second audio data via one or more sensors (e.g., a microphone) of receiving device 404 and send the second audio data to sending device 402. In some examples, in response to receiving audio data, a respective device (e.g., sending device 402 or receiving device 404) outputs audio data received from the other device via one or more output devices (e.g., a speaker). For example, receiving device 404 can output the first audio data via a speaker of receiving device 404 while sending device 402 can output the second audio data via a speaker of sending device 402. It should be recognized that, in some examples, sending device 402 initiates a telephone call via the PSTN network with multiple other devices. In such examples, the telephone call can be established after one or more (or, in some examples, all and/or most) recipients accept the telephone call.

In the example of the live communication being an internet call, sending device 402 can detect input to establish the live communication with receiving device 404 via an IP network (406). In some examples, the input at 406 includes a selection input of an internet call button after detecting an input of a phone number at a keypad of sending device 402. In other examples, the input at 406 includes a voice command to call another user and/or device. It should be recognized that other types of input via other types of user interfaces are within scope of this disclosure and the examples described above are intended to provide some illustrative examples. In response to detecting the input at 406 with respect to the internet call, sending device 402 calls (e.g., initiates the live communication with) receiver device 404 via the IP network (408). As a result of calling via the IP network, receiving device 404 can receive a communication via the IP network from sending device 402 indicating that sending device 402 is requesting to establish the internet call with receiving device 404. In some examples, after receiving device 404 accepts the internet call, sending device 402 and/or receiving device 404 sends data (e.g., video data, audio data, image data, and/or text data) to the other device (410). For example, sending device 402 can detect first data via one or more sensors (e.g., a camera, a microphone, and/or a keyboard) of sending device 402 and send the first data to receiving device 404 while receiving device 404 can detect second data via one or more sensors (e.g., a camera, a microphone, and/or a keyboard) of receiving device 404 and send the second data to sending device 402. In some examples, in response to receiving data (e.g., the first data or the second data), a respective device (e.g., sending device 402 or receiving device 404) outputs the data received from the other device via one or more output devices (e.g., a speaker and/or display). For example, receiving device 404 can output the first data via a speaker and/or a display of receiving device 404 while sending device 402 can output the second data via a speaker and/or a display of sending device 402. It should be recognized that, in some examples, sending device 402 initiates an internet call via the IP network with multiple other devices. In such examples, the internet call can be established after one or more (or, in some examples, all and/or most) recipients accept the internet call.

In the example of the live communication being a data transfer, sending device 402 can detect input to establish the live communication with receiving device 404 via a peer-to-peer channel (406). In some examples, the input at 406 includes a selection input of an indication of another device at sending device 402. In other examples, the input at 406 includes a voice command to send data to another user and/or device. It should be recognized that other types of input via other types of user interfaces are within scope of this disclosure and the examples described above are intended to provide some illustrative examples. In response to detecting the input at 406 with respect to the peer-to-peer communication, sending device 402 initiates the data transfer with (e.g., initiates the live communication with) receiving device 404 via the peer-to-peer channel (408). As a result of initiating the data transfer, receiving device 404 can receive a communication via the peer-to-peer channel from sending device 402. In some examples, the communication indicates a request for sending device 402 to transfer data to receiving device 404. In some examples, after receiving device 404 accepts the data transfer, sending device 402 sends data (e.g., audio data, video data, image data, and/or text data) to receiving device 404 (410). For example, sending device 402 can send a first audio data, a first video data, a first image data, and/or a first text data to receiving device 404 to be output, stored, and/or used by receiving device 404. In some examples, a progress indicator to show the progress of data being sent to receiving device 404 is output (via a speaker or display) by sending device 402. It should be recognized that, in some examples, sending device 402 initiates the data transfer with multiple other devices via multiple peer-to-peer channels. In such examples, each peer-to-peer channel can be established separately.

Figure 5:
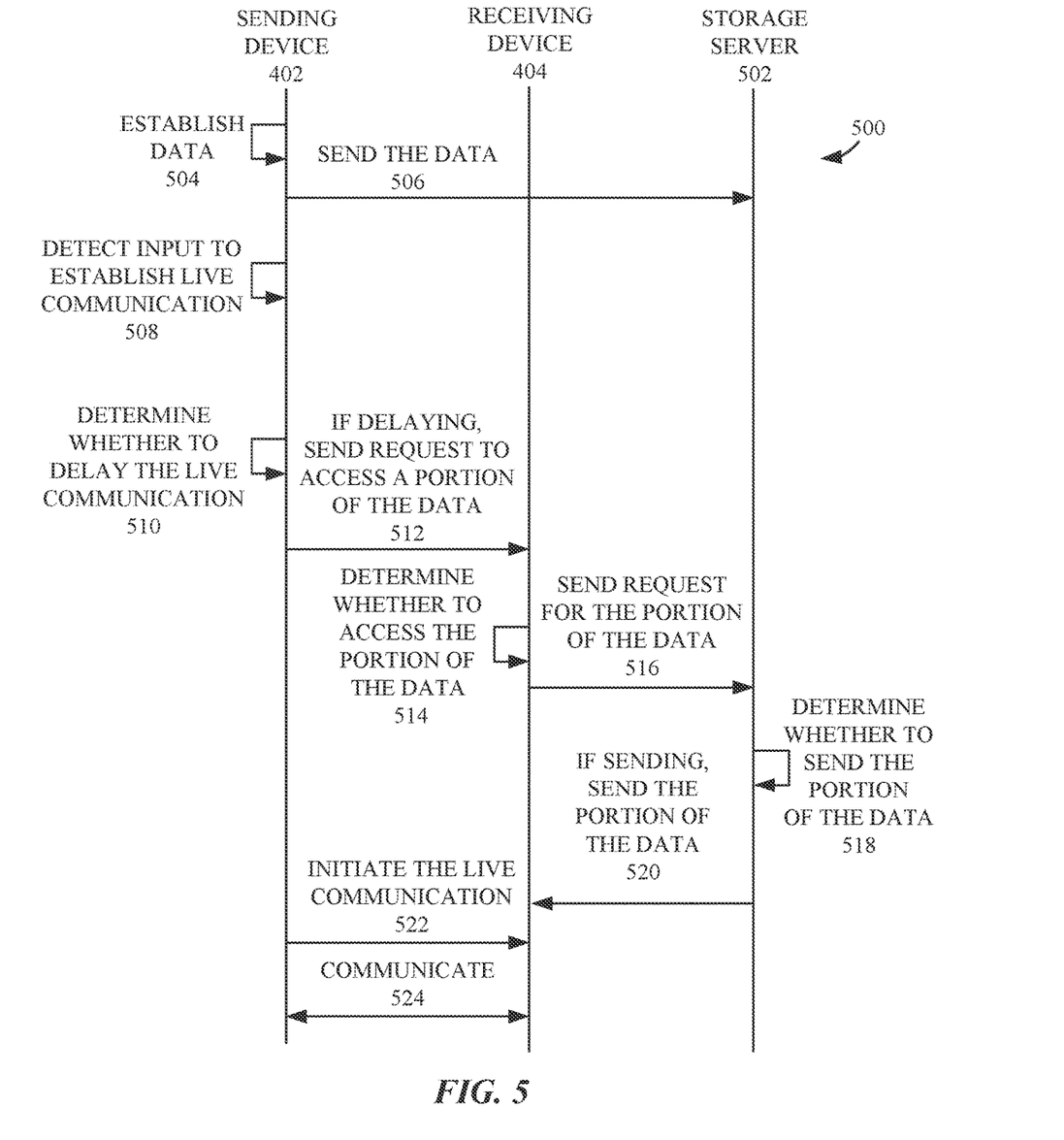
FIG. 5 is a swim-lane diagram illustrating a process to delay initiation of a live communication in accordance with some embodiments.

FIG. 5 is a swim-lane diagram illustrating a process (e.g., process 500) to delay initiation of a live communication (e.g., a telephone call, an internet call, and/or a data transfer, as described above with respect to FIG. 4) in accordance with some examples. As illustrated, process 500 includes sending device 402 (e.g., from FIG. 4), receiving device 404 (e.g., from FIG. 4), and storage server 502. In some examples, storage server 502 stores a set of data received from a respective device and/or sends a set of data to a respective device. For example, sending device 402 can send a set of data to storage server 502, and storage server 502 can send the set of data to receiving device 404. In some examples, storage server 502 includes one or more components and/or functionality described above with respect to server 340, device 200, and/or compute system 100.

At 504, sending device 402 establishes (e.g., makes, generates, and/or identifies) data. Examples of the data can include a digital profile, text, a widget, an application, an animation, an emoji, a representation of a user, a document, calendar information, personally-identifiable information, a file, an image, video, and/or audio. In some examples, the data defines how and/or when the data should be displayed. For example, the data can include how a visual appearance of a first portion of the data should be relative to a second portion of the data.

In some examples, the data at 504 corresponds to sending device 402 such that the data is established by sending device 402 at 504 to be used with respect to (e.g., to communicate with, while communicating with, and/or as a representation of) sending device 402. For example, the data can include a name and/or a photo corresponding to the first user that is displayed by another device to represent sending device 402, such as when sending device 402 is communicating with the other device. For another example, the data can include an indication of an event (e.g., a birthday and/or a meeting) that causes another device to output a notification when the event occurs, even when the other device is not communicating with sending device 402.

In some examples, the data at 504 includes different data corresponding to different types of devices, such as a smart phone, a smart watch, a laptop, a desktop, a tablet, a television, and/or another type of device. In such examples, the different data can be used with respect to particular types of devices. For example, when a receiving device is a smart watch, data corresponding to the smart watch can be sent to receiving device 404 that is customized for capabilities (e.g., screen size, memory size, and/or rendering ability) of the smart watch.

In some examples, the data at 504 includes different data corresponding to different contexts, such as different times of year, different items of day, and/or different groups of contacts. For example, if receiving device 404 is registered to a contact that is designated as a family member, receiving device 404 will receive data designated for family members. In some examples, data designated for different groups has varying amounts information and different images to reflect a user preference.

In some examples, sending device 402 establishes the data at 504 by detecting, via an input device in communication with sending device 402, one or more inputs (e.g., user inputs, such as tap inputs and/or non-tap inputs) to create, update, and/or obtain the data. In some examples, the data can be customized by the first user to reflect one or more preferences of the first user.

At 506, sending device 402 sends the data to storage server 502. The data can be sent to storage server 502 after and/or in response to sending device 402 establishing the data. In some examples, the data is sent to storage server 502 in preparation for and/or before communicating with other devices and/or as part of communicating with another device. For example, sending device 402 can send the data to storage server 502 as part of a configuration process for sending device 402 and/or for one or more applications of sending device 402. For another example, sending device 402 can send the data to storage server 502 in response to detecting a request to communicate with another device, such as receiving device 404. In such an example, the data can be sent prior to initiating a live communication, concurrently with initiating the live communication, or after initiating the live communication. In some examples, storage server 502 stores the data at a specific location within storage server 502 or at another device, so that the data can be accessed, received, retrieved, and/or downloaded by receiving device 404 (and/or another device). In some examples, sending device 402 and/or storage server 502 encrypts the data for added security and requires a decryption key to access the data. In some examples, sending device 402 requests storage server 502 to cache (e.g., pre-cache) the data (and/or a portion of the data) after or in conjunction with sending the data to storage server 502. For example, sending device 402 can request storage server 502 to cache the data when determining that an input to establish live communication 508, as described below with respect to 508 at FIG. 5, is likely to be detected soon (e.g., within a threshold amount of time, within a number of inputs, and/or when a user-interface element is displayed, that, when selected, causes initiation of a live communication). In some examples, in response to the request to cache, storage server 502 caches the data at a location based on and/or corresponding to receiving device 404, so that receiving device 404 can, in some examples, more efficiently download the data from storage server 502, as described below with respect to 520 in FIG. 5.

At 508, sending device 402 detects an input to establish a live communication, similar or the same as described above with respect to step 406 in FIG. 4. At 510, after and/or in response to detecting the input, sending device 402 determines whether to delay initiation of the live communication. Such delay can allow for time to transfer a portion of the data to receiving device 404, either directly and/or through storage server 502 as discussed further below.

In some examples, determining whether to delay includes determining whether receiving device 404 has already received the portion of the data. For example, sending device 402 can determine whether the portion of the data has been updated after and/or since causing receiving device 404 to access the portion of the data. When the portion of the data has been updated, sending device 402 can determine to delay initiation of the live communication. When receiving device 404 has not ever received the portion of the data, sending device 402 can determine to delay initiation of the live communication. For another example, sending device 402 can determine an amount of time, a number of communications, a number of live communications since causing receiving device 404 to access the data. When such factors exceed a threshold (e.g., the amount of time exceeds a predefined amount of time, the number of communications exceeds a predefined number of communications, and/or the number of live communications exceeds a predefined number of live communications), sending device 402 can determine to delay initiation of the live communication.

In some examples, determining whether to delay includes determining whether sending device 402 has detected an emergency within a predefined amount of time before the input is detected. When sending device 402 has detected an emergency within the predefined amount of time, sending device 402 can determine to delay initiation of the live communication. For example, when sending device 402 is initiating a live communication to a category of contacts such as an emergency call center, hospital, police station, fire station, and/or designated emergency contact, sending device 402 can detect that an emergency occurred within the predefined amount of time. In some examples, detecting an emergency includes detecting that sending device 402 is in an emergency mode, in an area with a limited network coverage for a predetermined period of time, using a satellite network for a predetermined period of time, and/or located in a proximity of an emergency event (e.g., severe weather, active shooter situation, a terrorist attack, and/or natural disaster). In some examples, detecting an emergency includes detecting an event (e.g., a user has fallen down, received an injury, has increased blood pressure, has abnormal blood oxygen levels and/or heart rate, and/or been in a wreck) via one or more sensors of sending device 402 and/or receiving a detection notice from an external device (e.g., a wearable device, a smart speaker, a smoke detector, a security alarm, and/or a head-mounted display) in communication with sending device 402.

If not delaying, sending device 402 initiates the live communication in response to determining not to delay initiation of the live communication (522) and communicates with receiving device 404 (524), similar or the same as described above with respect to 408 and 410 in FIG. 4. If delaying, sending device 402 waits a predefined amount of time before initiating the live communication (522) and communicating with receiving device 404 (524), similar or the same as described above with respect to 408 and 410 in FIG. 4. In some examples, the predefined amount of time varies based on configuration settings (e.g., privacy level and/or security settings), network capabilities, memory capabilities, device capabilities, and/or other criteria determined by sending device 402 with respect to sending device 402, receiving device 404, and/or storage server 502. For example, sending device 402 can delay different amounts when initiating different types of live communication with receiving device 404 and/or when initiating a live communication with different receiving devices.

At 512, in response to determining to delay initiation of the live communication, sending device 402 sends a request to receiving device 404. In some examples, the request is a request to access a portion of the data. In some examples, the request is sent even when a determination is made that the initiation of the live communication should not be delayed, though that would result in the portion of the data being accessed at the same time of or after initiating the live communication. In some examples, the request is sent before detecting the input, such as via another communication between sending device 402 and receiving device 404 (e.g., messaging communication, such as a text message, an internet message, and/or an email). In some examples, the request is sent to certain contacts (e.g., frequently contacted contacts and/or favorite contacts) in conjunction with sending the data to storage server 502 at 506. In some examples, the request is sent to receiving device 404 via a peer-to-peer channel or a network (e.g., the same or different network to be used for the live communication). In some examples, the request includes an indication of the portion of the data, a location of the portion of the data, one or more encryption and/or decryption keys to access the portion of the data via storage server 502, and/or other information to authenticate receiving device 404 and/or access the portion of the data via storage server 502. It should be recognized that while the above description related to the request is with respect to sending device 402 sending the request to receiving device 404, in some examples, the request can be sent directly to storage server 502 so that storage server 502 can send and/or determine whether to send the portion of the data to receiving device 404 without receiving device 404 receiving the request.

At 514, after and/or in response to receiving the request, receiving device 404 determines whether to access the portion of the data from storage server 502. In some examples, determining whether to access the portion of the data includes determining one or more settings (e.g., a privacy level and/or security setting) of receiving device 404. For example, receiving device 404 can include a setting that causes receiving device 404 to not obtain the portion of the data and/or delay when obtaining the portion of the data. In some examples, determining whether to access the portion of the data includes determining a current state of one or more resources (e.g., memory, network bandwidth, processor bandwidth, and/or network capabilities) of receiving device 404. For example, the memory of receiving device 404 can be nearly full and/or network on which receiving device 404 is connected is slow, causing receiving device 404 to determine to not access the portion of the data at this time.

At 516, after determining to access the portion of the data, receiving device 404 sends a request for the portion of the data to storage server 502. In some examples, receiving device 404 sends the request for the portion of the data before receiving a request to initiate the live communication from sending device 402. In other examples, receiving device 404 sends the request for the portion of the data after receiving the request to initiate the live communication from sending device 402, such as while the live communication is occurring or after the live communication has terminated. In some examples, the request for the portion of the data includes data included in the request received at 512, such as the identification of the portion of the data and/or authentication data for receiving device 404 to use with respect to storage server 502. In some examples, the request is sent using data included in the request received at 512, such as the request is encrypted using an encryption key received from sending device 402 and/or directed to the location of the portion of the data received from sending device 402.

In some examples, at 518, after receiving the request for the portion of the data, storage server 502 determines whether to send the portion of the data to receiving device 404. For example, storage server 502 can determine whether one or more current capabilities of receiving device 404 are sufficient to receive the portion of the data at this time. In some examples, the one or more current capabilities include a location, connectivity, a data plan, and/or available memory of receiving device 404. For example, certain locations can be determined to have lower bandwidth than others such that storage server 502 determines that when receiving device 404 is in those locations that sending the portion of the data should not occur. In some examples, the one or more current capabilities include whether receiving device 404 includes and/or is in communication with one or more output devices capable of outputting the portion of the data. In examples in which storage server 502 determines not to send the portion of the data, storage server 502 does not send the portion and instead, in some examples, notifies sending device 402 that the portion of the data is not sent and/or sends the portion of the data to receiving device 404 at a later time, such as when the one or more current capability of receiving device 404 are sufficient to receive the portion of the data. In some examples, based on criteria described above, storage server 502 determines to send less data than the portion of the data. In such examples, storage server 502 sends the less data in response to receiving the request for the portion of the data and, in some examples, sends more data (e.g., the rest or another subset of the portion of data) at a later time.

At 520, after determining to send the portion of the data to receiving device 404 (and/or after and/or in response to receiving the request for the portion of the data, such as when storage device 520 is not configured to determine whether to send the portion of the data to receiving device 404), storage device 520 sends the portion of the data to receiving device 404. In some examples, the portion of the data is encrypted when sent to receiving device 404, requiring receiving device 404 to decrypt the portion of the data before using (e.g., such as via a decryption key received from sending device 402 at 512). In some examples, the portion of the data is received by receiving device 404 before sending device 402 initiates the live communication. In such examples, receiving device 404 outputs and/or can output content from the portion of the data when the live communication is initiated. For example, receiving device 404 can output a name and/or photo corresponding to sending device 402 in response to receiving a request to initiate the live communication from sending device 402. In some examples, the portion of the data is received before or after the initiation of the live communication and, instead of outputting content corresponding to the portion of the data in response to receiving the request to initiate the live communication, receiving device 404 outputs such content after and/or in response to receiving device 404 answering, accepting, and/or starting the live communication.

Figure 6:
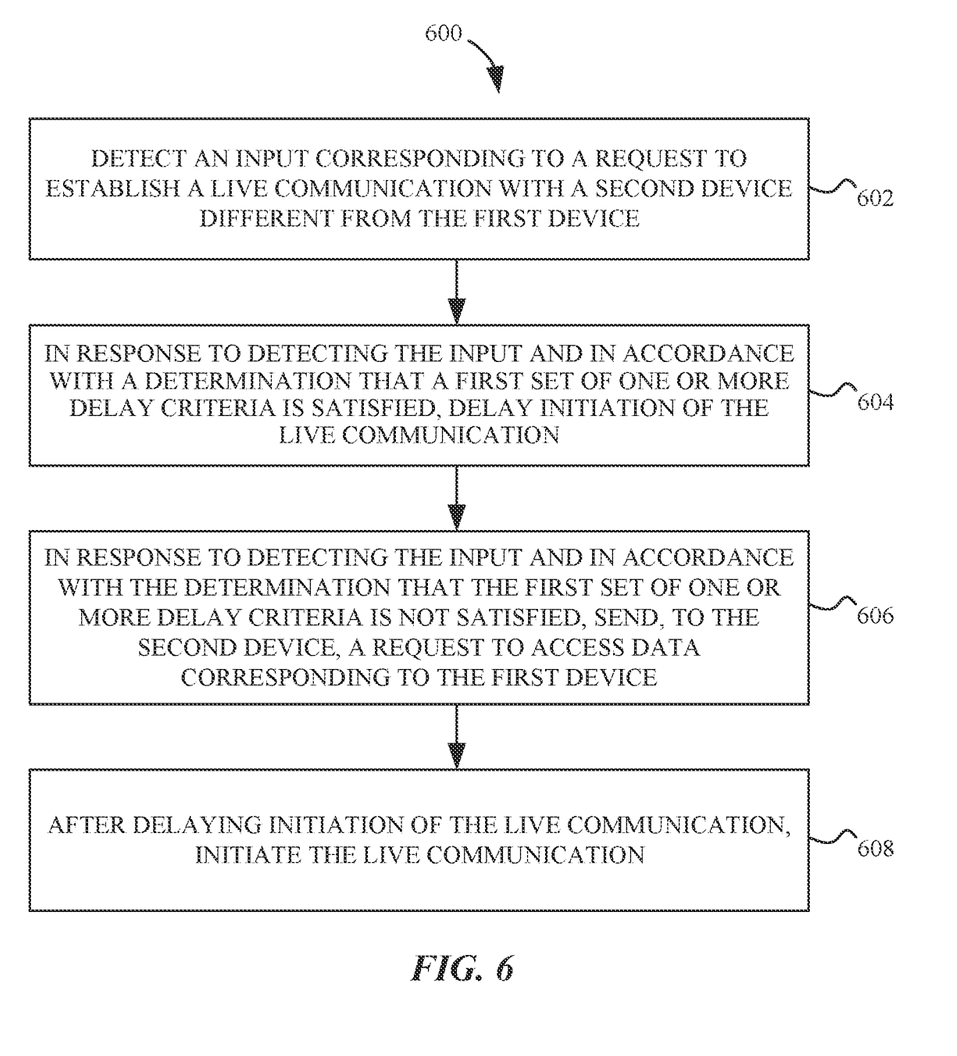
FIG. 6 is a flow diagram illustrating a method for selectively delaying a live communication in accordance with some embodiments.

FIG. 6 is a flow diagram illustrating a method (e.g., method 600) for selectively delaying a live communication in accordance with some examples. Some operations in method 600 are, optionally, combined, the orders of some operations are, optionally, changed, and some operations are, optionally, omitted.

As described below, method 600 provides an intuitive way for delaying a live communication between a sending device and a receiving device. Method 600 reduces the cognitive burden on a user by having the sending device delay the live communication to the receiving device, thereby creating a more efficient human-machine interface.

In some examples, method 600 is performed at a first device (e.g., a sending device, a calling device, a caller device, a communication device, a computer system, a personal device, and/or a user device) (e.g., sending device 402, first device 310, second device 320, or third device 330). In some examples, the first device is a smart phone, a smart watch, a wearable device, a laptop, a tablet, and/or a desktop computer.

At 602, the first device detects (e.g., 510) (e.g., via one or more input devices of, in communication with, and/or integrated with the first device) an input (e.g., a tap input and/or, in some examples, a non-tap input (e.g., a gaze, an air gesture/input (e.g., an air tap and/or a turning air gesture/input), a mouse click, a button touch, a swipe, lifting of the computer system from a first position to a second position, and/or a pointing gesture/input)) corresponding to a request to establish a live communication with a second device (e.g., receiving device 404, first device 310, second device 320, or third device 330) (e.g., a receiving device, a communication device, a computer system, a personal device, and/or a user device) different from the first device. In some examples, the second device is a smart phone, a smart watch, a wearable device, a laptop, a tablet, and/or a desktop computer.

At 604, in response to detecting the input and in accordance with a determination that a first set of one or more delay criteria is satisfied, the first device delays (e.g., time between 510 and 522 when delaying) (e.g., for 1-30 seconds) initiation of the live communication.

At 606, in response to detecting the input and in accordance with the determination that the first set of one or more delay criteria is satisfied, the first device sends (e.g., 512), to the second device, a request to access data corresponding to the first device.

At 608, after (and/or in response to detecting termination of) delaying initiation of the live communication, the first device initiates (e.g., 522) the live communication.

In some examples, the live communication includes (and/or is) a telephone communication (e.g., via cellular and/or a Public Switched Telephone Network (PSTN)) (e.g., a telephone call), an internet communication (e.g., via cellular, wi-fi, and/or a Voice Over Internet Protocol (VOIP) network) (e.g., an audio and/or video call) (e.g., an Internet call) (e.g., via an internet protocol), a peer-to-peer communication (e.g., via a peer-to-peer network), or any combination thereof. In some examples, the live communication includes communication of audio and/or video between the first device and the second device. In some examples, the live communication includes communication of data, such as an image, a video, contact information, and/or a recording. In some examples, the live communication includes download of data from one device to another. In some examples, the live communication does not include communication of audio and/or video captured by a sensor (e.g., a camera and/or a microphone) in communication with the first device and/or the second device. In some examples, the live communication includes outputting (e.g., displaying and/or playing) data (e.g., audio and/or video) received by the first device from the second device. In some examples, the live communication does not include outputting data (e.g., audio and/or video) received by the first device from the second device.

In some examples, after initiating the live communication, the first device detects (e.g., 508. a second time after 508 has already been performed once) a second input (e.g., different from the input) corresponding to a second request (e.g., different from the request) to establish a second live communication with the second device, wherein the second live communication is different (e.g., separate) from the live communication. In some examples, in response to detecting the second input and in accordance with a determination that a second set of one or more delay criteria is satisfied, the first devices delays (e.g., time between 510 and 522 when delaying) the second live communication. In some examples, the second set of one or more delay criteria is satisfied based on a predetermined period of time passing (e.g., after and/or in response to a determination that (1) the first set of one or more delay criteria is satisfied, (2) the live communication is terminated, and/or (3) the request to access data was last sent to the second device). In some examples, the second set of one or more delay criteria is satisfied when the predetermined period of time has passed, and the second set of one or more delay criteria is not satisfied when a second predetermined period of time (e.g., different from and/or less than the predetermined period of time) has passed. In some examples, the second set of one or more delay criteria is satisfied based on data corresponding to the first device being modified. ISE, the second set of one or more delay criteria is satisfied when data corresponding to the first device (and/or accessible to the second device) has been updated, and the second set of one or more delay criteria is not satisfied when data corresponding to the first device (and/or accessible to the second device) has not been updated. In some examples, the second set of one or more delay criteria is satisfied when the first device and the second device have not had a previous live communication. In some examples, the second set of one or more criteria is satisfied when the first device and the second device are not registered to the same owner, not registered to the same account, and/or not logged into accounts (e.g., application and/or device accounts) associated with each other. In some examples, the second set of one or more criteria is satisfied when the first device does not store identification information for the second device. In some examples, the second set of one or more delay criteria is satisfied based on a location (e.g., a current or previous location) of the second device. ISE, the second set of one or more delay criteria is satisfied when the location is a first location, and the second set of one or more delay criteria is not satisfied when the location is a second location different from the first location. In some examples, the second set of one or more delay criteria is satisfied based on capabilities of the second device (e.g., process speed, screen size, and/or memory size) and/or personalized settings (e.g., a privacy and/or security level, such as indicating that the first device would like to attempt to refresh after a certain period of time and/or communications with another device) of the second device. In some examples, the second set of one or more delay criteria is satisfied when the second device includes a first set of capabilities, and the second set of one or more delay criteria is not satisfied when the second device includes a second set of capabilities different from the first set of capabilities. In some examples, the second set of one or more delay criteria is satisfied when the second device includes a first set of personalized settings, and the second set of one or more delay criteria is not satisfied when the second device includes a second set of personalized settings different from the first set of personalized settings. In some examples, the second set of one or more delay criteria is satisfied based on the network connection of the second device. In some examples, the second set of one or more delay criteria is satisfied when the network connection of the second device is a first type (e.g., cellular, wi-fi, having a first bandwidth as opposed to a second bandwidth, is not currently using another network connection, and/or has a setting for the network connection to allow such communications), and the second set of one or more delay criteria is not satisfied when the network connection of the second device is a second type different from the first type. In some examples, in response to detecting the second input and in accordance with a determination that the second set of one or more delay criteria (and/or the first set of one or more delay criteria) is not satisfied (and/or a set of one or more other criteria is satisfied), the first device initiates the second live communication with the second device (e.g., without delaying initializing the second live communication). In some examples, the first device delays the second live communication. In some examples, the amount of delay (e.g., amount of time) of the second live communication is different from the amount of delay of the first live communication. In some examples, the amount of delay of the second live communication is the same as the amount of delay of the first live communication. In some examples, the first device sends, to the second device, a second request to access (e.g., download from an external computing device or server) second data (e.g., the data corresponding to the first device or different data from the data corresponding to the first device) corresponding to the first device. In some examples, after delaying initiation of the second live communication, the first device initiates the second live communication.

In some examples, before detecting the input, the first device sends (e.g., 506), to a first external computer system (e.g., storage server 502 or server 340) (e.g., server and/or a network of computing devices) (e.g., external relative to the first device and/or the second device) (e.g., a storage server and/or computer system), the data corresponding to the first device. In some examples, the first external computer system stores the data and, in response to receiving (e.g., 516) a respective request to access the data (e.g., from the second device and/or another device different from the second device) and in accordance with a determination that the respective request satisfied a set of one or more criteria (e.g., 518), sends (e.g., 520) at least a portion of the data to the second device. In some examples, in response to receiving the respective request to access the data (e.g., from the second device and/or another device different from the second device) and in accordance with a determination that the respective request does not satisfy the set of one or more criteria, the first external computer system forgoes sending the portion of the data to the second device.

In some examples, in response to detecting the input, the first device sends (e.g., 506), to a second external computer system (e.g., storage server 502 or server 340) (e.g., the first external computer system or an external computer system different from the first external computer system), the data corresponding to the first device. In some examples, the second external computer system stores the data and, in response to receiving (e.g., 516) a respective request to access the data (e.g., from the second device and/or another device different from the second device) and in accordance with a determination that the respective request satisfied a set of one or more criteria (e.g., 518), sends (e.g., 520) at least a portion of the data to the second device. In some examples, in response to receiving the respective request to access the data (e.g., from the second device and/or another device different from the second device) and in accordance with a determination that the respective request does not satisfy the set of one or more criteria, the second external computer system forgoes sending the portion of the data to the second device.

In some examples, the request includes an identifier corresponding to the data (e.g., an identifier of the data), a reference to a location that the data is stored (e.g., an identifier of an external computer system storing and/or managing the data, a memory location, and/or a server location), cryptographic information (e.g., key material, an encryption key to communicate with an external computer system (e.g., the encryption key is used by the second device to encrypt a message to be sent to the external computer system), a decryption key to decrypt the data (e.g., by the second device and/or an external computer system storing and/or managing the data), and/or an identifier of an encryption and/or decryption key), or any combination thereof.

In some examples, after initiating the live communication, the first device detects (e.g., 508) a third input (e.g., different from the input and/or the second input) corresponding to a third request (e.g., different from the request and/or the second request) to establish a third live communication with a third device (e.g., third device 330) different from the first device and the second device, wherein the third live communication is different from the live communication (and/or the second live communication). In some examples, the third device is a smart phone, a smart watch, a wearable device, a laptop, a tablet, and/or a desktop computer. In some examples, the third device is the same type of device as the first device and/or the second device. In some examples, in response to detecting the third input and in accordance with a determination that a third set of one or more delay criteria is satisfied, the first device delays the third live communication for a first period of time. In some examples, the live communication is delayed for a second period of time different from the first period of time. In some examples, a respective period of time for delaying is based on a characteristic (e.g., a type) of a device that is being communicated with (e.g., the second device and/or the third device). In some examples, the third set of one or more delay criteria includes the first set of one or more delay criteria and/or the second set of one or more delay criteria. In some examples, the third set of one or more delay criteria includes a criterion that is satisfied when a respective device (e.g., the third device) is a first type. In some examples, the criterion is not satisfied when the respective device is a second type different from the first type. In some examples, the third set of one or more delay criteria includes a criterion that is satisfied when a respective device (e.g., the third device) is a particular device. In some examples, the criterion is not satisfied when the respective device is not the particular device. In some examples, in response to detecting the third input and in accordance with a determination that the third set of one or more delay criteria is satisfied, the first device sends, to the third device, a third request to access third data (e.g., the data and/or different data that is different from the data) corresponding to the first device. In some examples, after delaying initiation of the third live communication for the first period of time, the first device initiates the third live communication.

In some examples, in response to detecting the input and in accordance with a determination that the first set of one or more delay criteria is not satisfied (and/or that a set of one or more criteria is satisfied), the first device initiates (e.g., 522) the live communication (e.g., without delaying initiation of the live communication). In some examples, the first set of one or more delay criteria is not satisfied (and/or the set of one nor more criteria is satisfied) in accordance with a determination that an emergency is occurring, the second device is an unknown recipient (e.g., relative to the first device), and/or the first device is configured to not delay live communications (e.g., with respect to the second device and/or with respect to any device).

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve how a device interacts with a user. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to change how a device interacts with a user. Accordingly, use of such personal information data enables better user interactions. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of image capture, the present technology can be configured to allow users to select to "opt in" or "opt out" of participation in the collection of personal information data during registration for services.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be displayed to users by inferring location based on non-personal information data or a bare minimum amount of personal information, such as the content being requested by the device associated with a user or other non-personal information.

What is claimed is:

1. A method, comprising:
   at a first device:
      sending, to a server, data corresponding to the first device;
      detecting an input corresponding to a request to establish a live communication with a second device different from the first device;
      in response to detecting the input and in accordance with a determination that a first set of one or more delay criteria is satisfied:
         delaying initiation of the live communication; and
         sending, by the first device to the second device, a request to access data corresponding to the first device, wherein the request, to access the data corresponding to the first device, is for the second device to retrieve the data via the server before initiation of the live communication, and wherein the request includes an identifier corresponding to the data, a reference to a location that the data is stored, cryptographic information, or any combination thereof; and
      after delaying initiation of the live communication, initiating the live communication.

2. The method of claim 1, wherein the live communication includes a telephone communication, an internet communication, a peer-to-peer communication, or any combination thereof.

3. The method of claim 1, wherein the data corresponding to the first device is sent to the server before detecting the input.

4. The method of claim 1, wherein the data corresponding to the first device is sent to the server in response to detecting the input.

5. The method of claim 1, wherein the set of one or more criteria includes a criterion based on: a state of the first device, a detection of the first device, a state of the second device, a previous communication between the first device and the second device, a last communication between the first device and the second device, communication between the first device and the second device, or any combination thereof.

6. The method of claim 1, wherein the live communication is a first live communication, the method further comprising:
   after initiating the first live communication, detecting a third input corresponding to a third request to establish a third live communication with a third device different from the first device and the second device, wherein the third live communication is different from the first live communication;
   in response to detecting the third input and in accordance with a determination that a third set of one or more delay criteria is satisfied:
      delaying the third live communication for a first period of time, wherein the first live communication is delayed for a second period of time different from the first period of time; and
      sending, to the third device, a third request to access third data corresponding to the first device; and
   after delaying initiation of the third live communication for the first period of time, initiating the third live communication.

7. The method of claim 1, further comprising:
   in response to detecting the input and in accordance with a determination that the first set of one or more delay criteria is not satisfied, initiating the live communication.

8. A non-transitory computer-readable storage medium storing one or more programs configured to be executed by one or more processors of a first device, the one or more programs including instructions for:
   sending, to a server, data corresponding to the first device;
   detecting an input corresponding to a request to establish a live communication with a second device different from the first device;
   in response to detecting the input and in accordance with a determination that a first set of one or more delay criteria is satisfied:
      delaying initiation of the live communication; and
      sending, by the first device to the second device, a request to access the data corresponding to the first device, wherein the request, to access the data corresponding to the first device, is for the second device to retrieve the data via the server before initiation of the live communication, and wherein the request includes an identifier corresponding to the data, a reference to a location that the data is stored, cryptographic information, or any combination thereof; and
   after delaying initiation of the live communication, initiating the live communication.

9. A first device, comprising:
   one or more processors; and
   memory storing one or more programs configured to be executed by the one or more processors, the one or more programs including instructions for:
      sending, to a server, data corresponding to the first device;
      detecting an input corresponding to a request to establish a live communication with a second device different from the first device;
      in response to detecting the input and in accordance with a determination that a first set of one or more delay criteria is satisfied:
         delaying initiation of the live communication; and sending, by the first device to the second device, a request to access the data corresponding to the first device, wherein the request, to access the data corresponding to the first device, is for the second device to retrieve the data via the server before initiation of the live communication, and wherein the request includes an identifier corresponding to the data, a reference to a location that the data is stored, cryptographic information, or any combination thereof; and after delaying initiation of the live communication, initiating the live communication.

10. The method of claim 1, wherein the data corresponding to the first device includes a name, a photo, a digital profile, a representation of a user, an image, or any combination thereof.

11. The method of claim 1, wherein the live communication is initiated without detecting another input after detecting the input corresponding to the request to establish the live communication with the second device.

12. The method of claim 1, wherein the live communication is initiated with the second device without the first device sending the data to the second device.

13. The non-transitory computer-readable storage medium of claim 8, wherein the live communication includes a telephone communication, an internet communication, a peer-to-peer communication, or any combination thereof.

14. The non-transitory computer-readable storage medium of claim 8, wherein the data corresponding to the first device is sent to the server before detecting the input.

15. The non-transitory computer-readable storage medium of claim 8, wherein the data corresponding to the first device is sent to the server in response to detecting the input.

16. The non-transitory computer-readable storage medium of claim 8, wherein the set of one or more criteria includes a criterion based on: a state of the first device, a detection of the first device, a state of the second device, a previous communication between the first device and the second device, a last communication between the first device and the second device, communication between the first device and the second device, or any combination thereof.

17. The non-transitory computer-readable storage medium of claim 8, wherein the live communication is a first live communication, the one or more programs further including instructions for:
after initiating the first live communication, detecting a third input corresponding to a third request to establish a third live communication with a third device different from the first device and the second device, wherein the third live communication is different from the first live communication;
in response to detecting the third input and in accordance with a determination that a third set of one or more delay criteria is satisfied:
delaying the third live communication for a first period of time, wherein the first live communication is delayed for a second period of time different from the first period of time; and
sending, to the third device, a third request to access third data corresponding to the first device; and
after delaying initiation of the third live communication for the first period of time, initiating the third live communication.

18. The non-transitory computer-readable storage medium of claim 8, the one or more programs further including instructions for:
in response to detecting the input and in accordance with a determination that the first set of one or more delay criteria is not satisfied, initiating the live communication.

19. The non-transitory computer-readable storage medium of claim 8, wherein the data corresponding to the first device includes a name, a photo, a digital profile, a representation of a user, an image, or any combination thereof.

20. The non-transitory computer-readable storage medium of claim 8, wherein the live communication is initiated without detecting another input after detecting the input corresponding to the request to establish the live communication with the second device.

21. The non-transitory computer-readable storage medium of claim 8, wherein the live communication is initiated with the second device without the first device sending the data to the second device.

22. The first device of claim 9, wherein the live communication includes a telephone communication, an internet communication, a peer-to-peer communication, or any combination thereof.

23. The first device of claim 9, wherein the data corresponding to the first device is sent to the server before detecting the input.

24. The first device of claim 9, wherein the data corresponding to the first device is sent to the server in response to detecting the input.

25. The first device of claim 9, wherein the set of one or more criteria includes a criterion based on: a state of the first device, a detection of the first device, a state of the second device, a previous communication between the first device and the second device, a last communication between the first device and the second device, communication between the first device and the second device, or any combination thereof.

26. The first device of claim 9, wherein the live communication is a first live communication, the one or more programs further including instructions for:
after initiating the first live communication, detecting a third input corresponding to a third request to establish a third live communication with a third device different from the first device and the second device, wherein the third live communication is different from the first live communication;
in response to detecting the third input and in accordance with a determination that a third set of one or more delay criteria is satisfied:
delaying the third live communication for a first period of time, wherein the first live communication is delayed for a second period of time different from the first period of time; and
sending, to the third device, a third request to access third data corresponding to the first device; and
after delaying initiation of the third live communication for the first period of time, initiating the third live communication.

27. The first device of claim 9, the one or more programs further including instructions for:
in response to detecting the input and in accordance with a determination that the first set of one or more delay criteria is not satisfied, initiating the live communication.

28. The first device of claim 9, wherein the data corresponding to the first device includes a name, a photo, a digital profile, a representation of a user, an image, or any combination thereof.

29. The first device of claim 9, wherein the live communication is initiated without detecting another input after detecting the input corresponding to the request to establish the live communication with the second device.

30. The first device of claim 9, wherein the live communication is initiated with the second device without the first device sending the data to the second device.

* * * * *